(12) United States Patent  
Sauer et al.

(10) Patent No.: US 9,075,462 B2  
(45) Date of Patent: Jul. 7, 2015

(54) FINGER-SPECIFIC INPUT ON TOUCHSCREEN DEVICES

(71) Applicants: Dietmar Michael Sauer, Hoechstaedt (DE); Ilona Eirich, Walldorf (DE)

(72) Inventors: Dietmar Michael Sauer, Hoechstaedt (DE); Ilona Eirich, Walldorf (DE)

(73) Assignee: SAP SE, Walldorf (DE)

( * ) Notice: Subject to any disclaimer, the term of this patent is extended or adjusted under 35 U.S.C. 154(b) by 157 days.

(21) Appl. No.: 13/709,857

(22) Filed: Dec. 10, 2012

(65) Prior Publication Data

US 2014/0160035 A1   Jun. 12, 2014

(51) Int. Cl.
*G06F 3/041* (2006.01)
*G06F 3/0488* (2013.01)

(52) U.S. Cl.
CPC .............. *G06F 3/041* (2013.01); *G06F 3/0488* (2013.01); *G06F 2203/04808* (2013.01)

(58) Field of Classification Search
USPC .......................................................... 345/173
See application file for complete search history.

(56) References Cited

U.S. PATENT DOCUMENTS

2005/0253814 A1* 11/2005 Ghassabian ................... 345/168
2010/0090966 A1*  4/2010 Gregorio ....................... 345/173
2010/0177056 A1*  7/2010 Kocienda et al. ............. 345/173
2011/0187637 A1*  8/2011 Nichols ......................... 345/156
2011/0234503 A1*  9/2011 Fitzmaurice et al. ......... 345/173
2012/0299810 A1* 11/2012 Trent ............................. 345/156

OTHER PUBLICATIONS

Trenholm, Rich; CNET UK article *"Microsoft Digits controls any gadget without touching"*. http://crave.cnet.co.uk/gadgets/microsoft-digits-controls-any-gadget-without-touching-50009430; pub. Oct. 9, 2012; 2 pages; last visited Oct. 18, 2012.

* cited by examiner

*Primary Examiner* — Charles V Hicks
(74) *Attorney, Agent, or Firm* — Fish & Richardson, P.C.

(57) ABSTRACT

This specification describes apparatus, computer-implemented methods, and systems for interacting with computing systems using finger-specific input. In one general embodiment, a finger-specific input device can identify and differentiate each finger of a user. For example, the finger-specific input device may be able to detect features of each individual finger, such as fingerprints or detectable finger attachments, and to determine a set of fingers using the input device by camera or other visual cue, among others. A user can use multiple fingers to interact with a computing system and generate commands based on the use of a particular finger, a particular combination of fingers, and particular gestures of specific finger or combination of finger movements. In some implementations, specific commands are assigned to corresponding fingers and/or finger-specific multi-touch gestures in a program environment. In some implementations, users can define specific commands for specific fingers and/or finger-specific multi-touch gestures.

19 Claims, 4 Drawing Sheets

FINGER-SPECIFIC INPUT ON TOUCHSCREEN DEVICES

BACKGROUND

An input device is a peripheral (e.g., piece of computer hardware equipment) used to provide data and control signals to an information processing system such as a computer or other information appliance. Many input devices can be classified according to their modality of input (e.g., mechanical motion, audio, visual, etc.), number of degrees of freedom involved, and the type of digital or analogue input. For example, a touchscreen is an electronic visual display that can detect the presence and location of a touch (e.g., of a finger, hand, or a stylus) within the display area. A touchpad (or trackpad) is a pointing device featuring a tactile sensor, a specialized surface that can translate the motion and position of a user's fingers to a relative position on screen. A mouse is a pointing device that functions by detecting two-dimensional motion relative to its supporting surface. The mouse's motion typically translates into the motion of a pointer on a display, which allows for fine control of a graphical user interface. These input devices can interact with graphical user interfaces directly (e.g., when using a touchscreen) or indirectly (e.g., when using a touchpad or a mouse). A touchscreen or a trackpad may support multi-touch functions that include a touch sensing surface's (e.g., the touchscreen or trackpad) ability to recognize the presence of two or more points of contact with the surface.

SUMMARY

The present disclosure relates to computer-implemented methods, systems, and devices for finger-specific input (e.g., each finger may be associated with specific commands). In a general aspect, a computer implemented method includes detecting a contact at an electronic device. A finger associated with the detected contact is identified. A finger-specific command associated with the contact from the identified finger is then determined and performed.

The foregoing and other implementations can each optionally include one or more of the following features:

A first aspect, combinable with the general implementation, the electronic device includes a touchscreen display. The contact is detected with the touchscreen display.

A second aspect, combinable with any of the previous aspects, further includes displaying a graphical user interface element on the touchscreen display. The finger-specific command is determined based on the identified finger and the graphical user interface element.

A third aspect, combinable with any of the previous aspects, further includes detecting a second contact with the touchscreen display, and identifying a second finger associated with the second contact. The finger-specific command is determined based on the gesture and the identified finger.

A forth aspect, combinable with any of the previous aspects, further includes detecting a gesture wherein the finger-specific command is determined based on the gesture and the identified finger.

In a fifth aspect, combinable with any of the previous aspects, the finger associated with the received contact can be identified by analyzing the fingerprint of the finger.

In a sixth aspect, combinable with any of the previous aspects, the finger associated with the received contact can be identified by performing a visual analysis of a hand touching the input device.

In a seventh aspect, combinable with any of the previous aspects, the finger associated with the received contact can be identified by receiving input from a set of finger attachments. The set of finger attachments can include at least one of an electronic glove having five finger receivers for each finger of an average human hand, a plurality of visual attachments for optical recognition, or a plurality of radio-frequency identifications (RFIDs) embedded to each finger.

In an eighth aspect, combinable with any of the previous aspects, the identification of the finger associated with the received contact can include at least one or a combination of two or more of: analyzing the fingerprint of the finger, performing a visual analysis of a hand touching the input device, or receiving input from a set of finger attachments. In some implementations, the identification includes using a combination of two or more of: analyzing the fingerprint of at least one finger associated with the received contact; performing a visual analysis of a hand touching the input device to identify the at least one finger used with the received contact; and receiving input from one or more finger attachments associated with the at least one finger used with the received contact.

A ninth aspect, combinable with any of the previous aspects, wherein prior to receiving the contact, further includes receiving an indication of contact mode from a selector, the selector being associated with and triggering preparation for receipt of the finger-specific command. The finger-specific command is defined in a database of context-specific commands. The context-specific commands are applicable to a particular application.

In a tenth aspect, combinable with any of the previous aspects, the finger-specific command comprises an approval command and a rejection command in a business application. The approval command is associated with a contact from a first finger and the rejection command associated with a contact from a different second finger.

While generally described as devices or computer-implemented software embodied on tangible and non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This specification describes apparatus, computer-implemented methods, and systems for interacting with computing systems using finger-specific input. In one general embodiment, a finger-specific input device can identify and differentiate each finger of a user. For example, the finger-specific input device may be able to detect features of each individual finger, such as fingerprints or detectable finger attachments, and to determine a set of fingers using the input device by camera or other visual cue, among others. A user can use multiple fingers to interact with a computing system and generate commands based on the use of a particular finger, a particular combination of fingers, and particular gestures of specific finger or combination of finger movements. In some implementations, specific commands are assigned to corresponding fingers and/or finger-specific multi-touch gestures in a program environment. In some implementations, users can define specific commands for specific fingers and/or finger-specific multi-touch gestures.

The subject matter described in this specification can be implemented in particular implementations so as to realize one or more of the following advantages. A finger-specific contact device can identify specific finger input and enable commands associated with the specific finger input. Using such finger-specific input to interact with a computing system allows a user to efficiently input various commands. For example, finger-specific input can give commands by using a specific finger or a combination of specific fingers (e.g., using an index finger for affirmative commands, and using a thumb for negative commands) instead of acting onto a specific location (e.g., pressing specific keys/buttons or specific virtual keys/buttons on a touchscreen or trackpad). In some implementations, when using finger-specific input, less display area is required on the graphical user interface than when using non-finger-specific input for the same amount of interaction elements. The user may not need to move the fingers towards or at a specific location on a finger-specific touchscreen as intended commands or actions can be indicated by the specific finger(s) rather than the contact location of the finger(s). Finger-specific gestures can further provide better accessibility to users, such as visually impaired users. In those instances, a visually impaired person can use a finger-specific movement or gesture to indicate their selection as opposed to touching a specific place on a screen they may have difficulty viewing or understanding.

Figure 1:
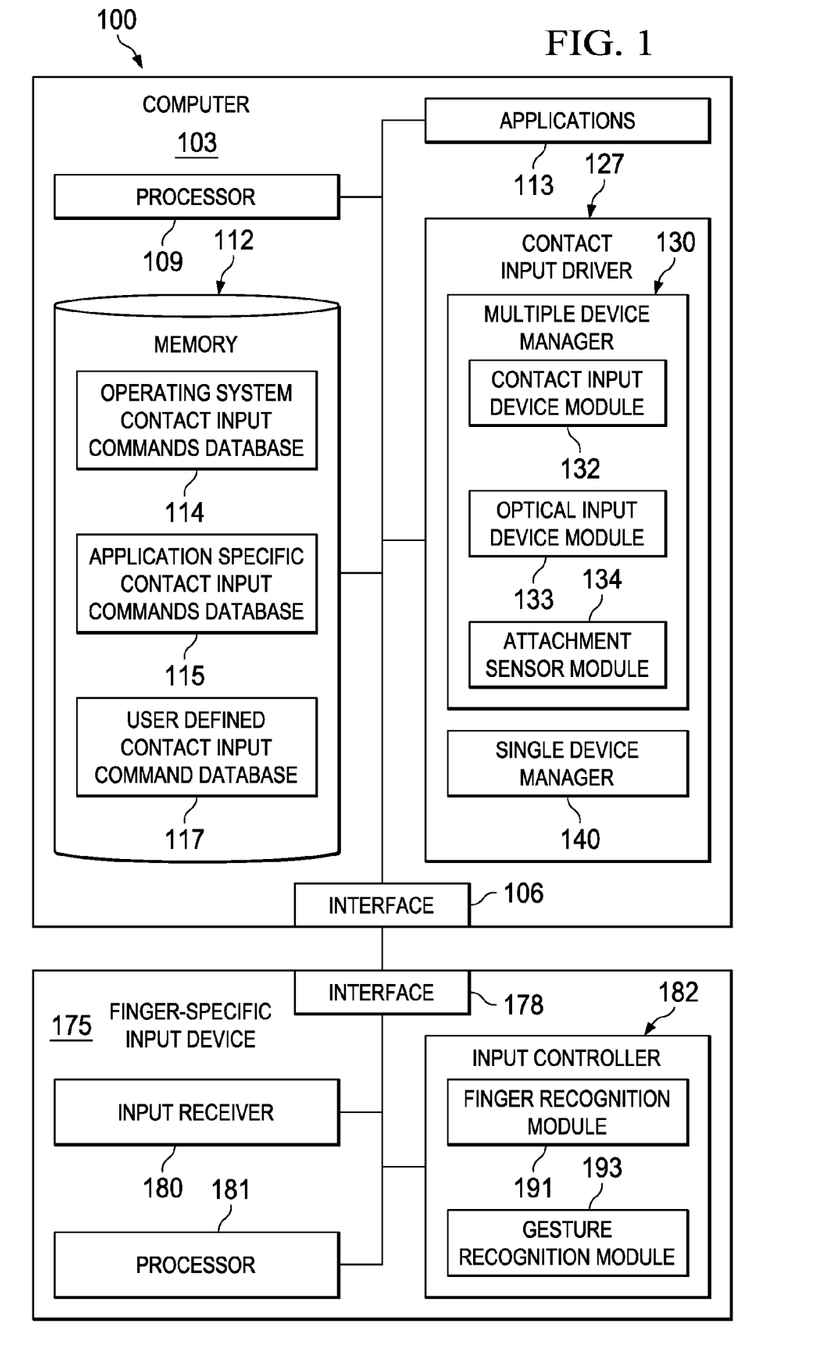
FIG. 1 illustrates an example computer system for implementing various features of a finger-specific input device.

FIG. 1 illustrates an example computer system 100 for implementing various features and functionality of an example finger-specific input device 175. The illustrated example computer system 100 includes, or is communicably coupled with, a computer 103 (e.g., a desktop computer, a laptop computer, a smart phone, a tablet computer, a post-computer appliance, etc.), and the finger-specific input device 175. In general, the computer system 100 depicts an example configuration of a system for interfacing an input device with a computer machine. For example, the finger-specific input device 175 includes an interface 178 to connect with the interface 106 of the computer 103. The interface 178 and the interface 106 can follow certain computer connection standards, such as universal serial port (USB), serial port, parallel port, game port, and PS/2 connector, among others. The computer 103 may be connected with other input and/or output devices not illustrated in FIG. 1. For example, the computer 103 can be connected with a keyboard, a scanner, a joystick, a microphone, a camera, and/or other input devices. The computer 103 can also be connected with a monitor, a printer, a speaker, and/or other output devices.

At a high level, the finger-specific input device 175 can receive a user's finger-specific input and transmit the signal to the computer 103 for generating finger-specific commands. For example, the finger-specific input device 175 can receive a contact from a user, identify at least one finger associated with the contact, and send a signal identifying the at least one finger associated to the contact to the computer 103. The computer 103 can include a contact input driver 127 to interpret the signal into a finger-specific command associated with the finger associated with the contact. The finger-specific input device 175 includes at least the interface 178, a processor 181, an input receiver 180, and an input controller 182. At a high level, the input receiver 180 includes hardware (and associated software) for receiving and interpreting signals of a contact, such as a touchscreen, an optical sensor, an RFID sensor, or other appropriate receivers. The input controller 182 can, based on the received contact signal, identify finger-specific information associated with the contact. The processor 181 can process data for the input receiver 180 as well as the input controller 182 and generate an output to send to the computer 103 via the interface 178. The computer 103 can subsequently process the output and apply a command interpreted from the received output signal to an application.

In some implementations, the finger-specific input device 175 is a touchscreen supporting multi-touch functionalities capable of identifying features of specific fingers. For example, the input receiver 180 can capture the fingerprint of a finger associated with the contact (e.g., via a biometric fingerprint scanner). The fingerprint can then be used to identify the specific finger related to the individual finger or multi-contact. The input receiver 180 can also capture the contact with visual information (e.g., monitoring hand movement using a camera) to identify specific fingers corresponding to the contact signal. In other instances, the input receiver 180 can receive signals generated in association within finger attachments (e.g., visual attachments, radio-frequency identifications, etc.). In still other instances, a combination of two finger-specific determinations may be used to identify one or more fingers associated with a touch-based input, such as a combination of a fingerprint scan and a camera- or video-based visual confirmation, as well as any other suitable combination. Details of example implementations of the input receiver 180 are illustrated in FIGS. 2, 3, 4A, 4B, and 4C, and are described below.

Figure 2:
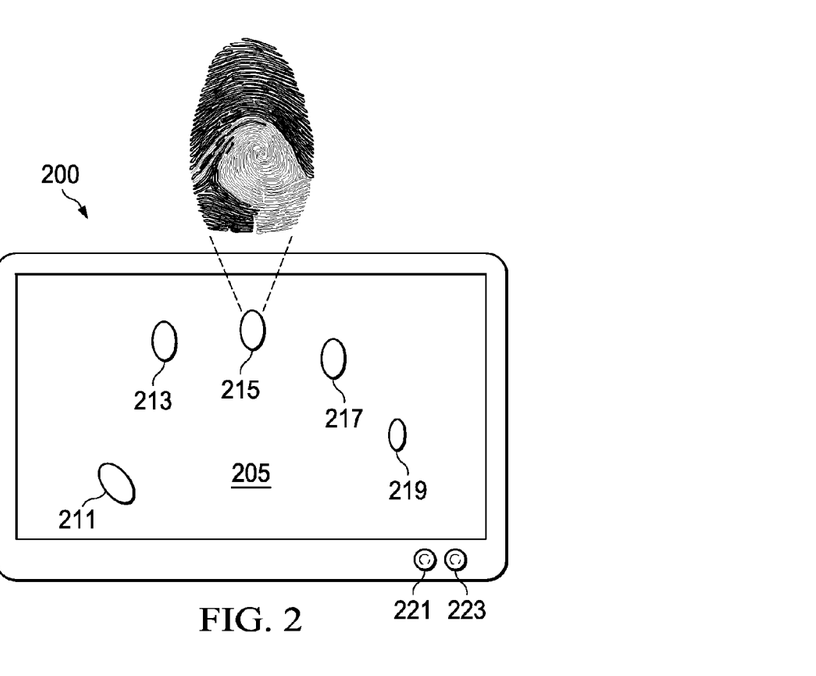
FIG. 2 illustrates an example finger-specific input device using fingerprint analysis.

In some implementations, the input receiver 180 can be a touchscreen with fingerprint analysis capabilities. FIG. 2 illustrates an example finger-specific input device 200 using fingerprint analysis. The device 200 includes a touchscreen 205, and control buttons 221 and 223. The touchscreen 205 may display a graphical user interface (GUI) as well as receive multi-contact from a user. The multi-touch function of touchscreen 205 can be based on various touchscreen technologies, including capacitive, resistive, optical, force-sending, and wave technologies, such as surface acoustic wave, capacitive sensing, surface capacitance, projected capacitance, infrared, optical imaging, dispersive signal technology, acoustic pulse recognition, etc. The display function of the touchscreen 205 can be based on various display technologies, including liquid crystal display, cathode ray tube, projection, plasma display, organic light emitting diode, etc. In some implementations, the touchscreen 205 can be a dual layer touchscreen that includes a touch sensitive layer superpositioning above a display. In some implementations, the touchscreen 205 can be an integrated touchscreen where a touch sensitive layer is integral with a display. Other implementations are possible.

The touchscreen 205 can further capture fingerprint information of the contacting fingers 211, 213, 215, 217 and 219 as illustrated in FIG. 2. For example, the touchscreen 205 can use a particular statistical fingerprint feature related to the applied technology for fingerprint analysis. In some implementations, the touchscreen 205 can scan high-resolution images of the fingers of the contact. The fingerprint detection result can match the fingerprints with pre-calibrated or saved data to determine which specific finger is corresponding to a particular contact in the multi-touch function. The touchscreen 205 can receive contact from multiple fingers. Although five fingers 211, 213, 215, 217, and 219 are illustrated in FIG. 2 to be recorded on the touchscreen 205, less or more fingers may be simultaneously acting onto the touchscreen 205, and the same finger (e.g., ring finger) on each of the user's hands may be separately identified. The buttons 221 and 223 can enable users to switch between different pre-settings of finger-specific commands. For example, the button 221 can enable users to select a first pre-setting of commands, in which the index finger of the right hand corresponds to "Yes" while the thumb of the right hand corresponds to "No." The button 223 can enable users to select a second pre-setting of commands, in which the index finger of the right hand corresponds to "No" while the thumb of the right hand corresponds to "Yes". Other different implementations are possible. In some implementations, the touchscreen 205 may be replaced with a trackpad for mere input purposes and use a separate monitor or display.

Figure 3:
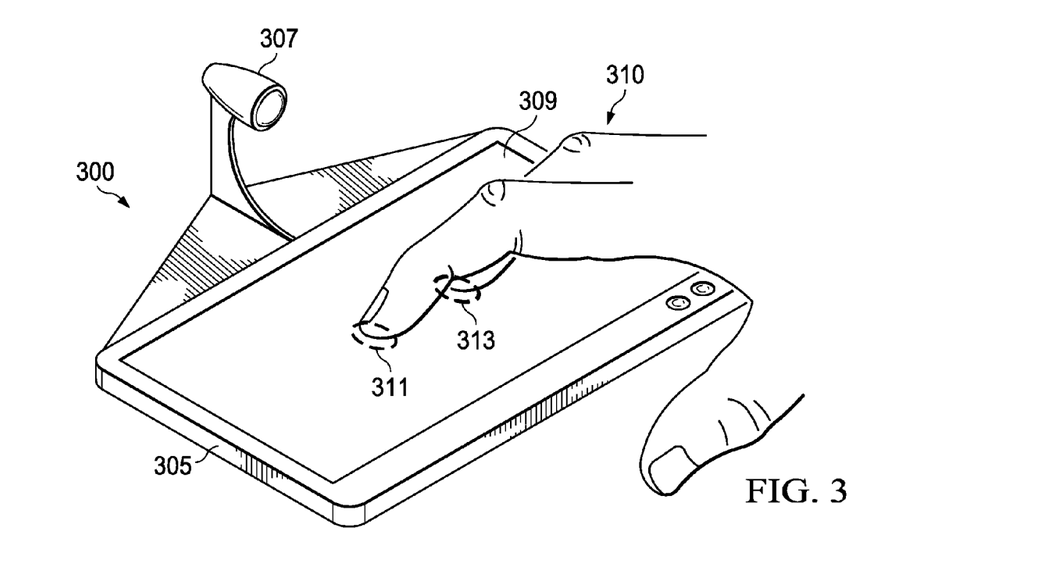
FIG. 3 illustrates an example finger-specific input device using visual analysis.

In some implementations, the input receiver 180 can be a trackpad or touchscreen with visual detectability for visual analysis. Turning now to FIG. 3, FIG. 3 illustrates an example finger-specific input device 300 using visual analysis. The finger-specific input device 300 includes a base 305, a camera 307, and a trackpad 309. In some instances, the trackpad 309 may be replaced with a touchscreen for direct multi-contact. The base 305 provides structural support for the camera 307 to be placed at a raised position and oriented downwards to enclose the trackpad 309 in the field of view. In some implementations, the camera 307 may be detached from the input device 300 and provided separately. The finger-specific input device 300 can simultaneously receive multi-contact on the trackpad 309 and monitor hand motion using the camera 307. The two streams of data (i.e., multi-touch and visual hand motion) can be processed and combined to determine specific fingers of a hand. For example, the trackpad 309 can detect the location of each contact 311 and 313 while the camera 307 can determine the shape/contour of the hand 310 touching the trackpad 309. Video analysis can correlate features of the hand and the location of contact to identify each finger associated with each contact.

Figure 4A:
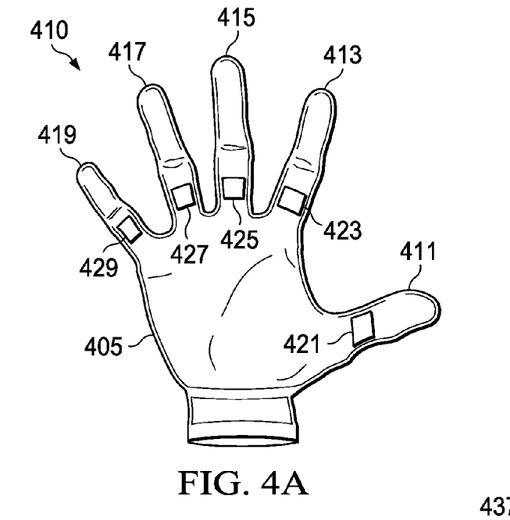
FIGS. 4A to 4C illustrate different examples of finger-specific input devices using finger attachments.

In some implementations, the input receiver 180 can be an electronic glove having five finger receivers for each finger of an average human hand. The electronic glove can be used in combination with a touchscreen. FIG. 4A illustrates an example finger-specific input device 410 using finger attachments embedded into an electronic glove 405. The electronic glove 405 includes a thumb pocket 411, an index finger pocket 413, a middle finger pocket 415, a ring finger pocket 417, and a pinky pocket 419. Each of the finger pockets is integrated with a sensor measuring the movement of the pocket. The thumb pocket 411 is integrated with a sensor 421; the index finger pocket 413 is integrated with a sensor 423; the middle finger pocket 415 is integrated with a sensor 425; the ring finger pocket 417 is integrated with a sensor 427; and the pinky pocket 419 is integrated with a sensor 429. The sensors 421, 423, 425, 427, and 429 can be piezoelectric sensors, strain gauges, or any suitable sensors for detecting bending and stretching deformation of the finger pockets 411, 413, 415, 417, and 419. For example, a user can fit one hand into the electronic glove 405 in a way that each finger pocket is tangible to the corresponding finger. As the finger moves, the corresponding finger pocket deforms with the motion, generating signals at the sensors 421, 423, 425, 427, and 429. The signals generated can be combined with the hand's multi-touch movement/gestures on a touchscreen, thereby identifying specific fingers associated with contact.

Figure 4B:
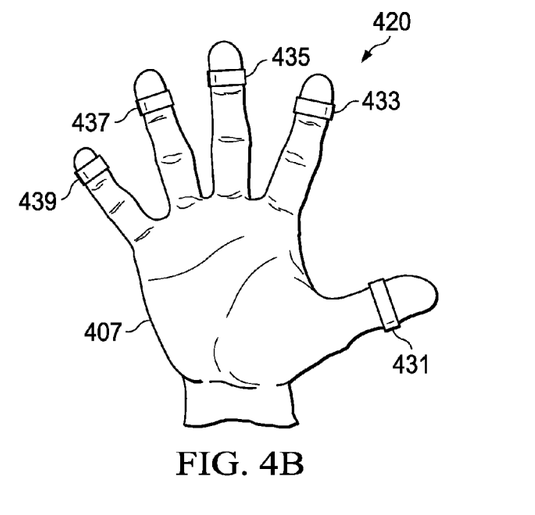

In some implementations, the input receiver 180 can employ video analysis using visual finger attachments in combination with a touchscreen or trackpad for finger-specific input. FIG. 4B illustrates a set of example finger-attachments 420 using visual finger attachments. The set of example finger-attachments 420 includes visual finger attachments 431, 433, 435, 437, and 439 attaching to each finger on an average human hand 407. The visual finger attachments 431, 433, 435, 437 and 439 can use various visual differentiation methods for video analysis to identify each specific finger. For example, the visual finger attachments 431, 433, 435, 437 and 439 can be rendered with materials reflecting lights of different wavelengths to differentiate one from another. In other instances, the visual finger attachments can use different shapes or different tags/trackers/markers for differentiation. The visual finger attachments can be used with a finger-specific input device having a video camera and a touchscreen, such as the device 300 illustrated in FIG. 3. For example, the camera 307 can capture videos of the visual finger attachments 431, 433, 435, 437, and 439 for video analysis to identify each specific finger associated with the contact received on the trackpad 309. In other instances, the visual finger attachments can be used directly with a touchscreen and a camera for the video analysis.

Figure 4C:
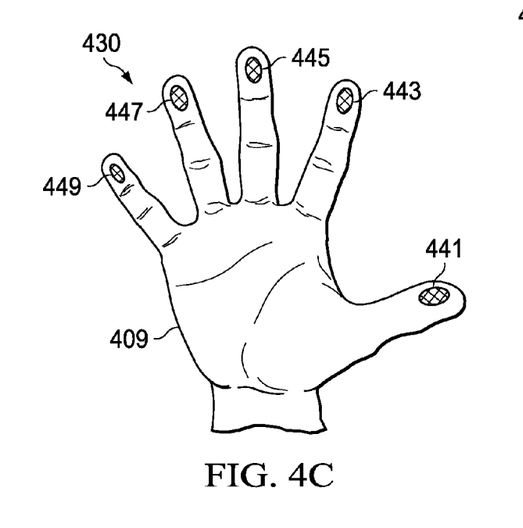

In some implementations, the input receiver 180 can employ radio-frequency identification (RFID) as finger attachments in combination with a touchscreen or trackpad for finger-specific input. FIG. 4C, for example, illustrates a set of example finger-attachments 430 of RFIDs attached to user fingers. In general, RFID uses a wireless non-contact system that employs radio-frequency electromagnetic fields to transfer data from a tag attached to an object for the purpose of automatic identification and tracking. The RFID tags may not require any battery (e.g., powered by the electromagnetic fields that is used to read the RFID tags). Others may use a local power source and actively emit radio waves. RFID tags can include electronically stored information that can be read wirelessly at a distance (e.g., several meters away). As illustrated in FIG. 4C, five RFIDs 441, 443, 445, 447, and 449 are attached to the user's fingers on the user's hand 409. The RFIDs 441, 443, 445, 447, and 449 can be attached to the corresponding fingers using temporary or permanent methods, such as Velcro products, general adhesives, wearing means (e.g., wearable as a ring, a glove, or the like), and other attachment methods. The RFID signal can be monitored and detected by a distinct or integrated RFID scanner, along with multi-contact performed on a touchscreen or trackpad to determine finger-specific input from the user. FIGS. 4A to 4C illustrate sets of finger attachments for all fingers, however, in some implementations, finger attachment sets can be applied to a few fingers (i.e., not all fingers).

Although detailed examples of the input receiver 180 are discussed in FIGS. 2, 3, 4A, 4B, and 4C, it should be understood that other implementations of various sensors, mechanisms, schemes, or methods may be used to realize the hardware for finger-specific touch and multi-contact on a touchscreen.

Returning to FIG. 1, the input controller 182 can further analyze the contact received at the input receiver 180 for generating output control signals to the computer 103. As illustrated, the input controller 182 includes at least a finger recognition module 191 and a gesture recognition module 193. The finger recognition module 191 can, as supported by the processor 181, perform analysis to identify finger-specific multi-contact received at the input receiver 180. For example, when the input receiver 180 is a touchscreen with fingerprint analysis capabilities (as illustrated in FIG. 2), the finger recognition module 191 can perform the data analysis to match the detected fingerprint scans with a correct fingerprint in the database to identify the finger(s) associated with contact. Similarly, if the input receiver 180 includes the finger-specific input device 300 that employs visual and multi-touch data collection, then the finger recognition module 191 is responsible for processing the video analysis and data correlation for identifying specific fingers associated with the contact. In general, the finger recognition module 191 can be stand-alone or part of an integrated circuit that samples and processes data from the input receiver 180.

The gesture recognition module 193 can record, analyze, and recognize the sequence of motion or gesture related to a multi-contact. For example, the gesture recognition module 193 can record gestures of a single tap, a double tap, a triple tap, a long press, a scrolling motion, a panning motion, a flicking motion, a pinch motion, a spreading motion, a rotation motion, and other gestures of one or more fingers. In some implementations, the gesture recognition module 193 collaborates with the finger recognition module 191 to identify finger-specific input with multi-touch gestures. For example, a single tap by an index finger, by a different finger, and by two or more fingers can be different gestures, and therefore associated with a different command or action. A double tap with a combination of fingers can also produce different gestures. A rotation motion with two fingers (e.g., the thumb and the index finger) can be one specific gesture; while a rotation motion with three fingers (e.g., the thumb, the index finger, and the middle finger) can be another specific, and different, gesture. Therefore, different combinations of specific fingers and their gestures can be recorded at the finger recognition module 191 and the gesture recognition module 193 of the input controller 182.

In some implementations, the input controller 182 may be integrated with the input receiver 180 as a single component. The finger recognition module 191 and the gesture recognition module 193 may be integrated as a single component or be two different components on the same circuit board. Similarly, one or more of the components of the finger-specific input device 175 as illustrated in FIG. 1 can be physically separate or integrated, depending on application and design priorities. The finger-specific input device 175 can be connected with the computer 103 using plug-and-play connections, permanent connections, or other forms of connections. In some implementations, the finger-specific input device 175 can be physically integrated with the computer 103 as a whole, or be distinct peripherals as illustrated in FIG. 1.

The computer 103, which can be a desktop computer, a laptop computer, a smart phone, a tablet computer, a multimedia player, or similar electronic devices, includes an interface 106, a processor 109, memory 112, applications 113, and a contact input driver 127. The interface 106 is used by the computer 103 to communicate with peripheral devices such as the finger-specific input device 175. The interface 106 and the interface 178 may comply with specific industry standards of computer peripherals, such as universal serial port (USB), serial port, parallel port, game port, PS/2 connector, among others. The interface 106 generally includes logic encoded in hardware and/or software in a suitable combination and operable to communicate with other computer peripherals. In some implementations, the interface 106 may include software supporting one or more communication protocols associated with communications such that the interface hardware is operable to communicate physical signals within and outside of the system 100 (e.g., with peripherals not shown in FIG. 1).

The processor 109 can be any appropriate processing unit or units to enable computation in the computer 103. Although illustrated as a single processor 109 in the computer 103, two or more processors may be used in the computer 103 according to particular needs, desires, or particular embodiments of computer system 100. Generally, the processor 109 executes instructions and manipulates data to perform the operations of the computer 103 and, specifically, the functionality associated with the corresponding applications 113 and/or the contact input driver 127. In one implementation, the computer's processor 109 executes the functionality required to receive inbound communications from and send outbound communications to the finger-specific input device 175, as well as the functionality required to perform the operations of the associated applications 113 and/or contact input driver 127, among others.

The memory 112 of the illustrated computer 103 stores at least an operating system contact input commands database 114, an application specific contact input commands database 115, a user defined contact input command database 117, and other data and programs installed on the computer 103. Some or all of the elements illustrated within memory 112 may be stored external to the memory 112 (e.g., in a detachable memory medium such as memory cards and portable hard drives). In some implementations, including a cloud-based system, some or all of the memory 112 may be stored remote from the computer 103, and communicably coupled to the computer 103 for usage. Specifically, the memory 112 can store databases for operating system, application specific or user specific commands. For example, the operating system contact input commands database 114 includes finger-specific multi-touch commands defined in an operating system, such as WINDOWS, MACINTOSH, IOS, ANDROID, and other operating systems. The application specific contact input commands database 115 includes particular sets of commands corresponding to finger-specific contact and multi-contact for various specific applications. A word processing application may have one set of commands associated with certain gestures of finger-specific contact; while a graphic processing application may have another. The commands in the applications can include selection, affirmation, menu navigation, function initiation, and other functionalities. Users may also define finger-specific gestures or multi-touch combinations as certain functions for a particular application. The user defined functions can be saved as commands in the user defined contact input command database 117. For example, the user can initiate a learning session for an application or the operating system to record a finger-specific multi-touch gesture and link the recorded gesture with a specific function/command in the application or the operating system.

At a high level, the applications 113 can be any software for performing business and/or non-business functions on a particular computer 103. For example, the applications 113 can perform specific functionalities, such as word processing, programming, design, numerical analysis, simulation, graphic processing, business applications, multi-media processing, etc. The applications 113 may also include one or more operating systems, such as Microsoft Windows, Apple's Mountain Lion, iOS, or other releases, Linux, UNIX, Google Android, or any other suitable OS. In some implementations, the applications 113 may operate in response to one or more contacts received from a finger-specific input device 175 or other input peripherals. Additionally, the applications 113 may operate in response to and/or in connection with other applications of the computer 103 (not illustrated) external to the computer 103.

The contact input driver 127 enables the operating system of the computer 103 to process the finger-specific contact transmitted from the finger-specific input device 175. The contact input driver 127 includes a multiple device manager 130 and a single device manager 140. The contact input driver 127 performs as a central software manager to process data collected from the input receiver 180 and the input controller 182 of the finger-specific input device 175. For example, the contact input driver 127 may monitor and adjust parameters related to hardware, use various data processing filters, incorporate updates, and manage cooperation of multiple sensing components. The multiple device manager 130 can process contact signals of multiple components from finger-specific input device 175. For example, when the finger-specific input device 175 adopts an input scheme of a touchscreen in combination with another data sampling device (e.g., a camera, RFIDs, etc.) the multiple device manager 130 can include multiple drivers for each component, such as a contact input device module 132, an optical input device module 133, and an attachment sensor module 134, and can combine the information received from each device/module to determine an appropriate response to the input. When the finger-specific input device 175 adopts an integrated scheme (e.g., a touchscreen with fingerprint identification), the single device manager 140 can provide a complete driver to drive the finger-specific input device 175.

In some implementations, the contact input device module 132 can be a driver for a touchscreen, a trackpad, or other contact devices. The contact input device module 132 may communicate with the contact device through a computer bus or a communication subsystem of the computer 103. The contact input device module 132 can issue data acquisition commands to the contact device. For example, the contact input device module 132 can be used with the trackpad 309 as illustrated in FIG. 3. Similarly, the optical input device module 133 can include driver information for the camera 307. When a finger-specific input device uses a set of finger attachments such as the example devices 410, 420, and 430, the attachment sensor module 134 can provide driver and software support to the finger attachments.

In general, the computer 103 is any system or server that, with an operating system, stores and executes functionality associated with the applications 113, and/or contact input driver 127. In some instances, each computer 103 may store and/or execute a plurality of various other applications and components (not illustrated); while in other instances, the computer 103 may be a dedicated server meant to store and execute the applications 113 and/or contact input driver 127 for a particular platform or application and its related functionality. The computer 103 can include an electronic computing device operable to receive, transmit, process, store, or manage data and information associated with the computer system 100.

Figure 5A:
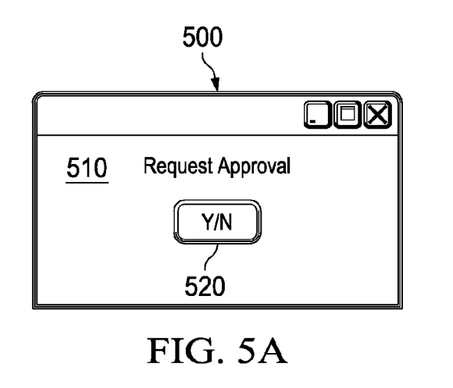
FIGS. 5A and 5B illustrate example user interfaces configured with a finger-specific input device.

FIGS. 5A and 5B illustrate example user interfaces configured with a finger-specific input device. FIG. 5A illustrates an example user interface 500 with a dialogue box 510. The dialogue box 510 is associated with an approval request presented to a user and awaiting the user's decision. One selectable button 520 is presented with the dialogue box 510. The user can use two different fingers acting (e.g., by a single tap) to the button 520 to indicate approval or disapproval. For example, the application associated with the dialogue box 510 may have a default setting of using an index finger to indicate an approval, and a thumb to indicate disapproval. This interaction with the user makes use of finger-specific input to reduce the amount of control information displaced in the user interface and takes advantage of using inherent command capabilities of finger-specific input. In some implementations, the button 520 may be completely omitted as the user is aware that each individual finger can have specific command indications. For example, the thumb may indicate a negative command; the index finger may indicate a positive command; the middle finger may indicate cancellation; the ring finger may indicate a skipping command; and the pinky may indicate minimizing the dialogue box. The user can have these commands using the same gesture of different fingers without being visually interrupted (e.g., the gesture of different fingers may be performed anywhere on the touchscreen). In some implementations, combinations of different fingers with different gestures can be associated with many different commands other than the illustrated button 520.

Figure 5B:
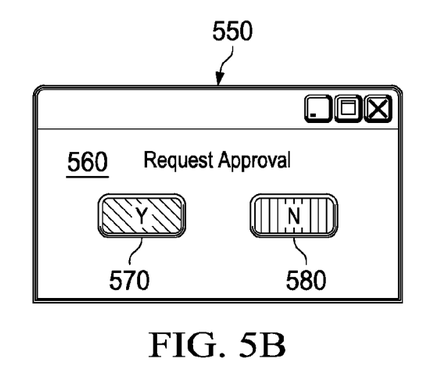

Turning now to FIG. 5B, FIG. 5B illustrates an example user interface 550 with a dialogue box 560. Contrary to the user interface 500 of FIG. 5A, the interface 550 emphasizes more on security rather than convenience. The dialogue box 560 is also associated with an approval request, presenting a user with two buttons 570 and 580. A single tap with a specific finger on the button 570 indicates a positive command; and a single tap with a different specific finger on the button 580 indicates a negative output. For example, the button 570 may only respond to a single tap action from the ring finger to affirm the approval request; while the button 580 may only respond to a single tap action from the thumb to decline the approval request. Input from other fingers may be ignored or cause a warning instruction window to clarify the input instruction. Therefore, the dialogue box 560 can avoid selecting a response by mistake, adding a second layer of awareness communication. In some implementations, the buttons 570 and 580 may be responding to only certain gestures and/or gestures in combination of specific fingers. For example, the button 570 may only respond to a double tap action in which the first tap is performed by the index finger and the second tap is performed by the ring finger. The button 580 may only respond to a double tap action in which the first tap is performed by the middle finger and the second tap is performed by the thumb. Other combinations of specific fingers and gestures are possible.

In some implementations, the combination of specific fingers and gestures can be used to give commands in an application environment without prompted buttons, dialogues, or menus. For example, any finger-specific multi-touch gesture may have inherent meaning for specific commands to open, launch, or modify objects in the application environment. Alternatively, the finger-specific inherent command may be initiated with a prompted visual element displayed at the graphical user interface. The prompted visual element may or may not require direct multi-touch interaction, as commands are identified by the finger-specific input. In one application environment, a single tap operation performed by a combination of up to all fingers of both hands can correspond to opening different menu items (e.g., to open, edit, close, etc.). This can save the display resources by hiding menus or other command buttons in the user interface. Other implementations of using finger-specific multi-contact are possible.

Figure 6:
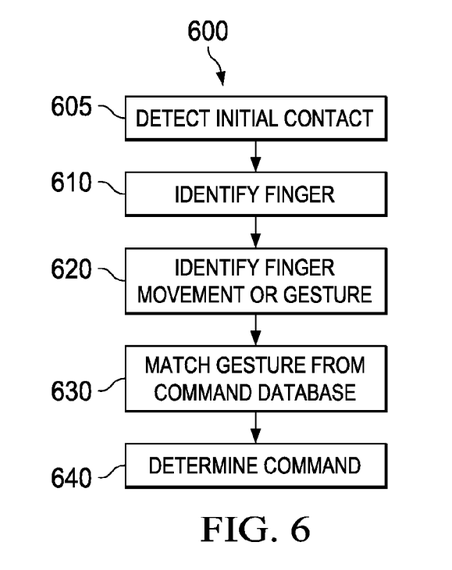
FIG. 6 illustrates an example method for using finger-specific input to generate commands.

FIG. 6 illustrates an example method 600 for using finger-specific input to generate commands. At 605, an electronic device detects a contact from a user. In some implementations the electronic device is a finger specific input device. The electronic device may include or may be a touchscreen capable of analyzing the fingerprint associated with each contact, a trackpad in combination with video analysis tools (e.g., a camera), a touchscreen or trackpad in combination with a set of finger attachments (e.g., electronic glove sensors, visual trackers, RFIDs, etc.), a touchscreen integrated into a computer or device display, and other appropriate contact devices. In some implementations, the electronic device includes a touchscreen display and the contact is detected by the touchscreen display. In some implementations the electronic device displays one or more graphical user interface elements. Stated in another way, the touchscreen display of the electronic device may display graphical user interface elements that accept and respond to user input. For example, the touchscreen display of the electronic device may display icons, buttons, text fields, and the like. The graphical user interface may be generated by an application running on the electronic device. In some implementations, contact with a graphical user interface element is detected. The contact received from the user may be the result of a single finger contact, a multi-finger contact, a single finger gesture, or a multi-finger gesture, among others. The electronic device may detect simultaneous contact of multiple fingers. For example, the contact may comprise the simultaneous contact of the user's middle finger and index finger with the electronic device (e.g., via a touchscreen display).

At 610, at least one finger associated with the detected contact is identified by analyzing the data gathered by the electronic device. In some implementations, the electronic device generates an image of the one or more fingers corresponding to the contact and identifies the one or more fingers using fingerprint analysis In some implementations, the electronic device captures a video of the user's hand movements during the contact and identifies the one or more fingers corresponding to the contact using the video. In some implementations, individual finger attachments for each finger can be used to identify the specific finger(s) associated with the contact, such as sensors in an electronic glove, visual trackers wearable on the fingers, RFIDs attached to each fingers, and other appropriate finger attachments. Other suitable methods of detecting specific fingers associated with the contact can be used. For example, specific fingers may be identified based on characteristic electric resistance associated with each finger contacting a contact device.

At 620, the movement or gesture of one or more specific fingers is identified and recorded. For example, the movement of one or more specific fingers can include tapping, long press, scrolling, panning, flicking, drawing, and the like. These movements may be performed by a specific finger or a combination of fingers. For example, the movement of both the index finger and the thumb moving at the same time may be detected. The gestures may include pinching, spreading, rotating, crossing, switching, and other combinations of movements. In some implementations, the movement or gesture of the one or more fingers is detected and identified while the one or more fingers are in contact with the electronic device. For example, the movement or gesture may be detected with a touchscreen display of the electronic device.

In some implementations, the electronic device detects and identifies successive contacts. Stated in another way, the electronic device may detect contacts that occur one after another. The contacts may be with the electronic device. For example, the electronic device may detect a first contact with the electronic device, release of the first contact from the electronic device, a second contact with the electronic device and a release of the second contact from the electronic device. In this example, the first contact and the second contact may comprise one or more fingers. In some implementations, the electronic device detects and identifies successive finger gestures or movements. For example, the electronic device may detect a first contact, a first movement or gesture of the first contact, and a second movement or gesture of the first contact. In another example, the electronic device may detect a first contact, a first movement or gesture of the first contact, release of the first contact, a second contact, and movement or gesture of the second contact.

At 630, the recorded and identified gesture is matched with commands from a command database. The command database stores information about what commands and operations to perform in response to a contact or gesture. Each finger, combination of fingers, finger movement, finger gesture, and combination of successive contacts may be associated with one or more commands. For example, a finger contact of just the thumb may be associated with a command while a finger contact comprising the index finger, the middle finger and the thumb may be associated with another command. Some movements performed by different fingers can result in different commands. The gestures can be performed by multiple specific fingers, and different fingers performing the same gesture may result in different commands. For example, a rotation gesture may be performed using multiple fingers rotating relative to the touchscreen or trackpad after contact. Rotating with the thumb, the index finger, and the middle finger may give a simple rotation command; while rotating with the thumb, the index finger, and the ring finger may give an alternative rotation command in which rotation is accompanied with zooming in and out; and rotating with the thumb, the index finger, and the pinky may give a reversed alternative rotation command in which the zooming command is reversed relative to the rotation direction. Other combinations of specific fingers and gestures are possible, and the examples herein are not meant to be exhaustive. Different combinations of successive contacts and gestures may result in different commands. For example, a first contact comprising an index finger followed by a second contact comprising the thumb may result in a command that is different than the command associated with a thumb contact. The command database may include general operating system commands, application-specific and user-specific commands, as well as situational commands only possible or usable under certain circumstances. For example, different commands in response to the same gesture may be applicable to different applications, as well as in different situations associated with those applications. Users may define customized finger-specific gestures to specific applications (or situations) as desired.

At 640, the finger-specific contact device (or an associated processing device or environment) can determine and apply the output command based on the finger-specific gesture and parameters related to the current application environment (e.g., choosing the correct command from the application or user specific command database).

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be (or can be embedded in) another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touchscreen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touchscreen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX®), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
    detecting a contact with a touch input device of an electronic device, wherein the touch input device is configured to receive touch input from one or more fingers and determine an electrical resistance associated with each of the one or more fingers providing the touch input;
    identifying at least one finger of the one or more fingers associated with the detected contact based on the determined electrical resistance, wherein each finger is identified based on a characteristic electric resistance corresponding to the respective finger as determined by the touch input device;
    determining a finger-specific command associated with the contact from the at least one identified finger, wherein the finger-specific command is determined based at least in part on each finger identified based on the characteristic electric resistance; and
    performing the determined finger-specific command.

2. The method of claim 1, wherein the touch input device comprises a touchscreen display.

3. The method of claim 2, further comprising displaying a graphical user interface element on the touchscreen display and wherein the finger-specific command is determined based on the identified finger and the graphical user interface element.

4. The method of claim 2, further comprising:
    detecting a second contact with the touchscreen display; and
    identifying a second finger associated with the second contact; and
    wherein the finger-specific command is determined based on the identified finger and the identified second finger.

5. The method of claim 1, further comprising detecting a gesture and wherein the finger-specific command is determined based on the gesture and the at least one identified finger.

6. The method of claim 1, wherein identifying the at least one finger further comprises analyzing the fingerprint of the at least one finger.

7. The method of claim 1, wherein identifying the at least one finger further comprises performing a visual analysis of a hand touching the input device.

8. The method of claim 1, wherein identifying the at least one finger further comprises receiving input from a set of finger attachments.

9. The method of claim 8, wherein the set of finger attachments includes at least one of an electronic glove having five finger receivers, one receiver for each finger of an average human hand, a plurality of visual attachments for optical recognition, or a plurality of radio-frequency identifications (RFIDs) embedded to each finger.

10. The method of claim 6, wherein the finger-specific command is defined in a database of context-specific commands, the context-specific commands being applicable to a particular application.

11. The method of claim 1, wherein prior to receiving the contact, further comprising receiving an indication of contact mode from a selector, the selector being associated with and triggering preparation for receipt of the finger-specific command.

12. The method of claim 1, wherein the finger-specific command comprises an approval command and a rejection command in a business application, the approval command associated with a contact from a first finger and the rejection command associated with a contact from a different second finger.

13. A computer-program product comprising computer-readable instructions embodied on tangible non-transitory media and operable when executed to:
- detect a contact with an electronic device via a touchscreen display capable of receiving touch input from one or more fingers and determining an electrical resistance associated with each of the one or more fingers;
- identify at least one finger of the one or more fingers associated with the detected contact based on the determined electrical resistance, wherein each finger is identified based on a characteristic electric resistance corresponding to the respective finger as determined by the touchscreen display;
- determine a finger-specific command associated with the contact from the at least one identified finger, wherein the finger-specific command is determined based at least in part on each finger identified based on the characteristic electric resistance; and
- perform the determined finger-specific command.

14. The computer-program product of claim 13, wherein the contact is detected with the touchscreen display.

15. The computer-program product of claim 14, further comprising computer readable instructions embodied on tangible non-transitory media and operable when executed to:
- detect a second contact with the touchscreen display; and
- identify a second finger associated with the second contact; and
- wherein the finger-specific command is determined based on the identified finger and the identified second finger.

16. A system of one or more computers configured to perform operations comprising:
- one or more processors;
- memory; and
- one or more programs, wherein the one or more programs are stored in the memory and configured to be executed by the one or more processors, the programs including instructions for:
  - detecting a contact with a touch input device of an electronic device, wherein the touch input device is configured to receive touch input from one or more fingers and determine an electrical resistance associated with each of the one or more fingers providing the touch input;
  - identifying at least one finger of the one or more fingers associated with the detected contact based on the determined electrical resistance, wherein each finger is identified based on a characteristic electric resistance corresponding to the respective finger as determined by the touch input device;
  - determining a finger-specific command associated with the contact from the at least one identified finger, wherein the finger-specific command is determined based at least in part on each finger identified based on the characteristic electric resistance; and
  - performing the determined finger-specific command.

17. The system of claim 16, wherein identifying the at least one finger associated the detected contact further comprises at least one of: analyzing the fingerprint of the at least one finger, performing a visual analysis of a hand touching the input device, or receiving input from a set of finger attachments.

18. The system of claim 17, wherein the set of finger attachments includes at least one of an electronic glove having five finger receivers, one receiver for each finger of an average human hand, a plurality of visual attachments for optical recognition, or a plurality of radio-frequency identifications (RFIDs) embedded to each finger.

19. The system of claim 16, wherein prior to receiving the contact, receiving an indication of contact mode from a selector, the selector being associated with and triggering preparation for receipt of the finger-specific command.

* * * * *